US005209517A

United States Patent [19]
Shagoury

[11] Patent Number: 5,209,517
[45] Date of Patent: May 11, 1993

[54] WHEELED VEHICLE

[76] Inventor: Paul B. Shagoury, 48 Fairmount Ave., Hyde Park, Mass. 02136

[21] Appl. No.: 299,239

[22] Filed: Jan. 18, 1989

Related U.S. Application Data

[63] Continuation of Ser. No. 900,597, Aug. 27, 1986, abandoned, which is a continuation-in-part of Ser. No. 567,554, Jan. 3, 1984, abandoned.

[51] Int. Cl.$^5$ ............................................... B62B 1/04
[52] U.S. Cl. ................................ 280/654; 280/47.18; 280/47.24; 280/47.26; 248/98; 220/324
[58] Field of Search ............. 280/47.131, 47.17, 47.18, 280/47.24, 47.26, 652, 654, 659; 248/97, 98; 211/22; 220/306, 309, 315, 319, 324, 334

[56] References Cited

U.S. PATENT DOCUMENTS

| | | | |
|---|---|---|---|
| 269,625 | 12/1882 | Blake | 248/98 |
| 1,638,203 | 8/1927 | Jetel | 248/98 |
| 3,754,771 | 8/1973 | Shagoury | 248/98 |
| 3,773,286 | 11/1973 | Govoni et al. | 248/97 |

Primary Examiner—Charles A. Marmor
Assistant Examiner—Richard Camby
Attorney, Agent, or Firm—Benway & Harrington

[57] ABSTRACT

A two wheeled vehicle which is utilized to receive a elasticized cloth laundry bag which in turn is used to receive linen and other washables from hospitals, nursing homes, other healthcare facilities and the like. The wheeled vehicle is collapsible for storage and has a unique cover to allow an open bag receptacle to be covered when not in immediate use and has a unique hinge assembly.

A two wheeled vehicle which is utilized to receive a plastic trash bag which in turn is used to receive and store household trash and garbage. The wheeled vehicle has a unique cover with vinyl foam tape attached along the periphery of the underside of the cover so that odors from trash and garbage stored therein are unable to escape from the plastic trash bag.

4 Claims, 5 Drawing Sheets

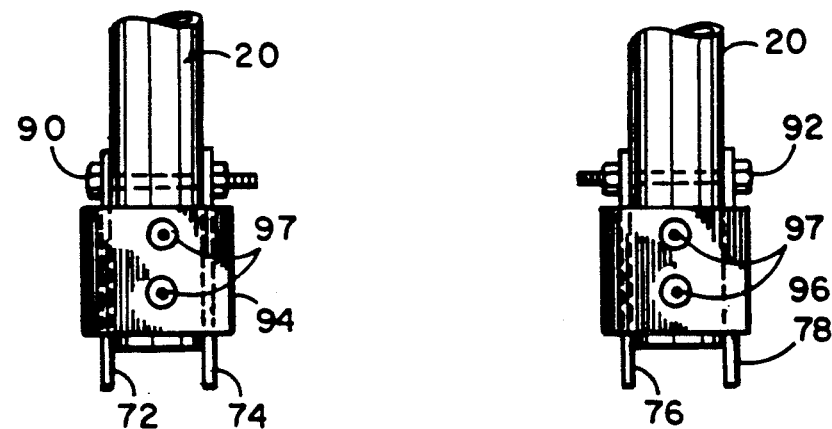
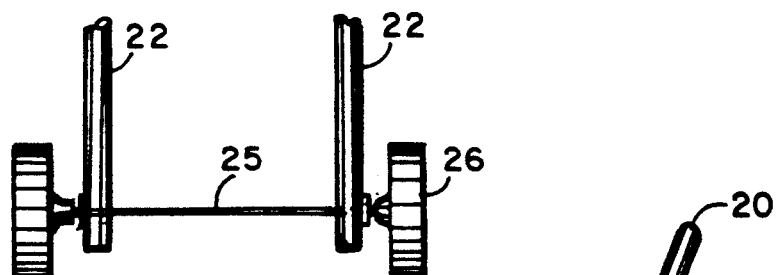
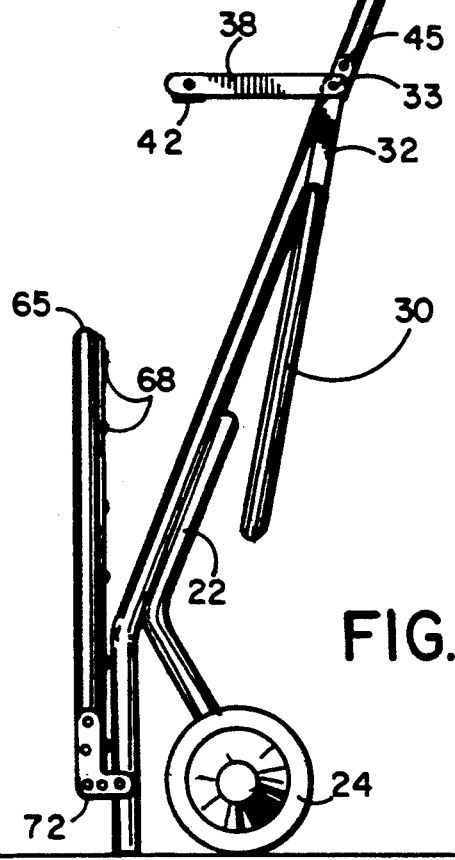

WHEELED VEHICLE

This is a continuation application of Paul B. Shagoury Ser. No. 900,597 filed Aug. 27, 1986 filed Oct. 27, 1986 which is now abandoned and which was a continuation abandoned.

The present inventor has developed a movable and collapsible plastic trash bag holder which was patented several years ago and received U.S. Pat. No. 3,754,771.

In the use of this product as a movable plastic trash bag holder, it was suggested that other uses might be explored. One use for the holder that was explored was to secure an elasticized cloth laundry bag which receives soiled laundry in hospitals, nursing homes and other healthcare facilities onto the two wheeled vehicle. However, in those circumstances certain problems were encountered which prevented the use of the movable plastic bag holder in this area.

First and foremost, with the use of soiled laundry a bag holder must have a cover to limit odor. In order to have a cover on a movable holder, it was discovered that the cover and the bag had to be placed on the receiving ring. This presented several structural difficulties. However, it was finally discovered that two detachable clamps (similar to the clamps used to secure plastic bags on the original patent unit) could be bolted to the periphy of the cover permitting it to be removably clamped on the ring. When the cover had been placed over the ring, one clamp acted as a hinge and the other locked the cover closed.

When in use, the hinge part of the cover would be seated on the stationary portion of the ring so that when the cover was opened it would rest against the handle. To allow the cover to rest against the handle, the stationary portion of the ring was thrust forward several inches so that the cover could rest against the handle as the bag was being filled. To avoid having the cover removed from the ring when attaching an elasticized cloth laundry bag (which is not secured with grips (clamps), as in the original patent), two eye bolts (hooks) were attached to the rear of the stationary ring, one on each side of the hinge attached to the cover. The elasticized bag would be stretched over both the movable and stationary portions of the ring and finally secured to the two eye bolts that are permanently affixed on the stationary ring, which are positioned on each side of the hinged cover. In this fashion the elasticized cloth laundry bag may be attached or removed quick and easy from the unit without removing the cover from the stationary portion of the ring.

Another difficulty encountered was in being able to store the cover with the movable bag holder in a collapsed, upright position without the unit tipping over from the weight of the cover. The handle was arced back in such a manner that the cover and ring could be stored very neatly in a suspended condition under the handle with the weight of the unit and cover being evenly distributed and balanced. This curvature also allowed the main frame and the holding ring to be aligned over the base of the wheeled vehicle. Cloth laundry bags could then be placed and secured on the ring by either an elasticized bag with the elasticity filled around the rings and attached to the two eye bolts without the cover being removed or held in place by grips (clamps).

The previous two wheeled mobile plastic bag holder had another problem concerning the use of the metal hinges which connected and held in place the base frame to the main frame. Hospital, nursing homes or other health-care facilities personnel, through inadvertence, would not release the common type of hinge in use before the unit was collapsed, and, therefore, the hinge would become damaged. Another problem encountered with the common type hinge is that if a bag was attached on the mobile bag holder and the bag did not touch the base frame, the weight of the load would be held in the bag which was suspended in the air, which in turn would put a strain on the common type of hinges and thus eventually cause the common type of hinge to become warped and permanently damaged and make the mobile bag holder inoperable.

With the hinges developed by the inventor, if the bag did not reach the base of the unit (improper size bag was used) and the bag was suspended in the air, the unit would break out of its rigid position as the bag was being filled, and the bag would come to rest on the base frame thus alerting the user that he was using an improper size bag for the unit. This caused no damage to the mobile bag holder or the L-hinges developed by the inventor. The inventor realized that simplicity in the use of the unit is required in hospitals, nursing homes and other healthcare facilities and felt rigidity at the base of the unit had to be fashioned in a hinge arrangement not of the type commonly in use. The inventor placed an indentation on the four L-bars which were attached to the base frame of the unit and thereafter pivoted onto the main frame. The L-bars were firmly secured in position by a locknut, washer and bolt assembly which provided proper rigidity in the hinged area to hold the unit firmly in position. The indentations on the four L-bars were placed in a specific position on the L-bars so that when the base frame was lowered, the indentations on the L-bars came to rest on the curve end of the tubing on the main frame which caused a binding rigidity and in turn prevented the main frame and base frame from collapsing. The indentations on the L-bars, in conjunction with the tension provided to the L-bars by the bolt, washer and locknut assembly, kept the unit rigid at all times while the bag was being filled. The assembly usually kept the base frame rigid at all times, but if it became loose, tightening up on the same assembly would keep the base and main frames rigid. To prevent the base of the unit and main frame from going completely back, the inventor placed stops on the rear of the main frame in line with the two sets of L-bars which were attached to the base frame. This prevented the unit going beyond a certain pivotal point which kept the main frame, the ring and the base frame completely aligned to ensure that the bag will be directly over the base of the unit when in use. An operator need only apply slight force to break the rigidity in the base and main frame so that the said unit can be collapsed for storage. With these discoveries the inventor eliminated the use of the common type of hinge which could become easily damaged and broken by the user by not releasing the hinge prior to collapsing the unit. In some instances the inventor realized that some of the healthcare facilities did not want the base frame of the unit to become collapsible, in which case the inventor secured the base and main frames together by drilling a hole through the two sets of L-bars and the main frame and inserted therein a bolt, lock washer and nut assembly. This caused the base frame to remain rigid at all times. In this fashion facilities could have the option of permanently securing the base frame so the unit would not become collapsible unless the nuts and bolts were removed.

The inventor also placed on top of the base frame a full plate which replaced the original cross-bars so that the laundry bag could be contained within the unit and not be dragging on the floor. A polyethylene clip was also attached to the tip of the base frame so that floors would not be scratched or marred by the metal tip of the base frame. The L-bars attached to the base frame and hinged to the main frame were raised slightly so that rear point of the base frame would not touch the floor when it was in the down position and thus prevented the floors from being scratched or marred by the rear portion of the base frame.

The inventor also discovered that if a vinyl foam tape was secured along the periphery on the underside of the cover which was attached to the movable plastic bag holder and a plastic trash bag, the vinyl foam tape would tightly rest against the four polyethene grips which secured the plastic trash bag and thus sealed the plastic bag. The seal over the plastic trash bag prevented odors from the trash and garbage stored inside the plastic bag from escaping. Homeowners would now be able to place their household trash and garbage in the plastic trash bag and use it as a storage container until it was filled and eventually tied and placed to one side for trash pick-up.

Another advantage for the homeowner was that he no longer had to struggle or strain in lifting a full and heavy plastic trash bag that usually gets stuck to the inside walls of the barrels by suction. Here the homeowner merely raised the cover and let it rest against the handle. The plastic trash bag would then be unsecured from the rings by releasing the four polyethene grips. The trash bag would be released downwards without any lifting whatsoever. The movable ring could be raised slightly to facilitate tying the plastic trash bag which is then placed to one side for trash pick-up.

Therefore, an object of the present invention is to have a wheeled vehicle bag holder with a cover that is removable entirely from a ring supporting a laundry bag, which is also pivotable about one of its ends, another end for regular opening and closing.

Another object of the present invention is to provide the wheeled vehicle with a hinged rigid base which is able to be folded into a collapsed or functionable position without the need or use of hinges commonly in use.

Another object of the present invention is to provide a wheeled vehicle with the option for a permanently fixed rigid base as opposed to a collapsible base by inserting a bolt, washer and nut assembly through a hole on each set of L-hinges and the main frame so that the base and main frames will remain permanently fixed at the option of the user.

Another object of the present invention is to provide a wheeled vehicle with a cover for receiving an elasticized cloth laundry bag to receive and store soiled laundry.

Another object of the present invention is to provide the wheeled vehicle with a cover and seal for receiving a plastic trash bag to receive and store household trash and garbage.

Other objects, features and advantages of the present invention will be better understood from the following detailed specifications of which:

FIG. 7 is a detailed view of base hinge assembly and stops from the rear.

FIG. 8 is a detailed view of wheeled axle attached to the frame.

FIG. 9 is a side view of the wheeled vehicle folded for storage.

Figure 1:
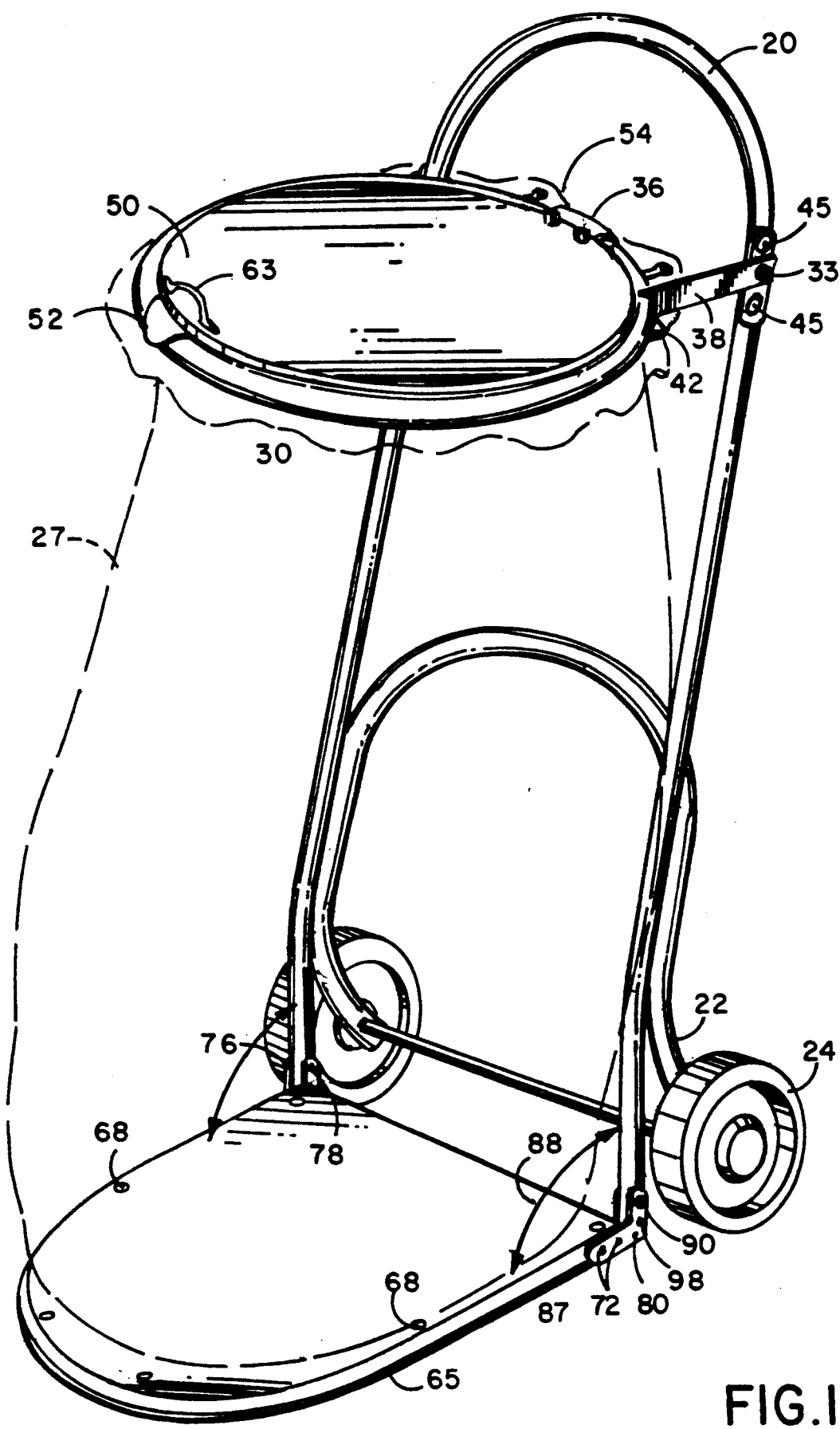
FIG. 1 is a side view of wheeled vehicle showing the cover open and an elasticized cloth laundry bag in place.

Referring to FIG. 1, we see a wheeled vehicle, 20, having a curved bar wheel frame, 22, attached to a set of wheels, 24 and 26. The main frame, 20, has a fixed rigid ring portion, 36, which is described in detail in FIGS. 4 and 5, and a movable ring segment, 30. The vehicle also has a base frame, 65, with a plate, 66, attached to it. Base frame, 65, is hingedly fixed to main frame, 20, by means of L-hinges, 72, 74, 76 and 78, which are described in detail in FIGS. 6 and 7. The vehicle is shown with an elasticized cloth laundry bag, 27. Additionally, a cover, 50, is shown in an open position, which can be closed in the direction of the arrow, 37.

Figure 2:
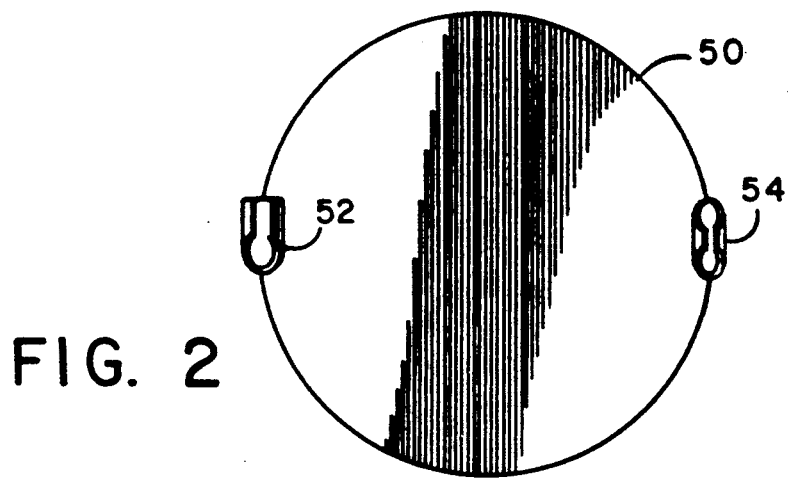
FIG. 2 is the bottom view of the cover.

Referring now to FIG. 2, we see the cover, 50, from the underside or bottom, with plastic hinge, 52, and plastic clamp, 54, bolted to it. Handle, 63, is not shown in this figure, but can be seen in FIG. 1. The clamp, 54, is used as a lock, holding the cover closed when the cover is closed. Hinge, 52, is snapped or clamped over the stationary ring, 36, and pivots about it acting as a hinge.

Figure 3:
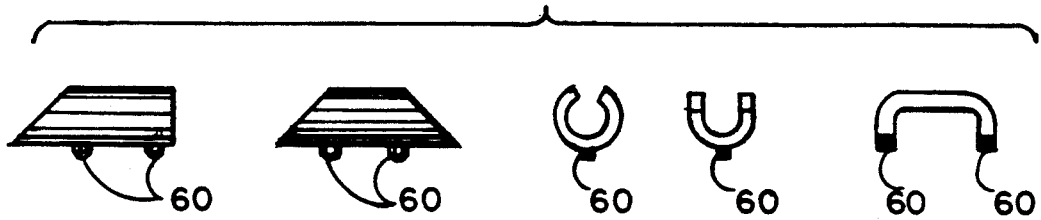
FIG. 3 is a detailed view of the hinge, clamps and handle attached to the cover.

Referring to FIG. 3, we see different views of plastic hinge, 52, and plastic clamp, 54: (a) shows a side view of hinge, 52; (b) shows a side view of clamp, 54; (c) shows an end view of hinge, 52; (d) shows the end view of clamp, 54; and (e) shows a side view of handle, 63. Handle, 63, is a conventional off the shelf item sold in hardware stores and is bolted by means of bolts, 60, to the cover, 50. Hinge, 52, is cut from a rigid tubing such as polypropylene tubing. Clamp, 54, is cut from a more flexible plastic tubing such as polyethylene tubing. Both hinge and clamp are bolted by means of bolts, 60, to the cover, 50. It is to be noted that hinge, 52, and clamp, 54, are cut as shown in the end view of (c) and (d) in such a fashion so that each may perform their respective function.

In FIG. 3 (d), clamp, 54, has a larger slit opening than (c), hinge, 52. Clamp, 54, must be cut in such a fashion so that the cover will be able to open and close with ease. The inventor discovered that a large slit opening in combination with lesser contact by the edges of the polyethylene tubing to the cloth laundry bag, 27, which is stretched over movable ring, 30, allows the cover (which is opened and closed often) to be operated with ease.

Clamp, 54, is bolted through the cover, 50, and secured to the two receiving ends of the handle, 63, by bolts, 60. To secure the clamp to the cover, the top section of the clamp must be long enough in length so that it can be secured to the receiving ends of handle, 63. The inventor found if clamp, 54, was not shaped as in FIG. 3 (d), the clamp would not function properly and would have a tendency to become stuck to the bag and ring when closed if the slit opening was too narrow. On the other hand, if the slit opening was too wide, it would not lock on the ring, 30, but it would remain loose and ride on top of laundry bag, 27, and movable ring, 30.

Whereas for the hinge to be functional and also not be easily removed, the inventor realized that the hinge must be shaped differently than the clamp. To accomplish this feature so that the cover could not be easily removed and also without it being permanently attached to the rings, the inventor discovered that both the inside diameter of the polypropylene tubing and the outside diameter of the stationary ring, 36, had to have the same dimensions. That hinge, 52, had to be cut and designed with a lesser slit opening, which is shown in FIG. (c). It was further discovered that if the hinge was only sloped on one end to facilitate engaging the hinge on the stationary ring, 36, as shown in FIG. (a), the hinge would be more permanently affixed to the stationary ring, 36, and could not be easily removed.

Figure 4:
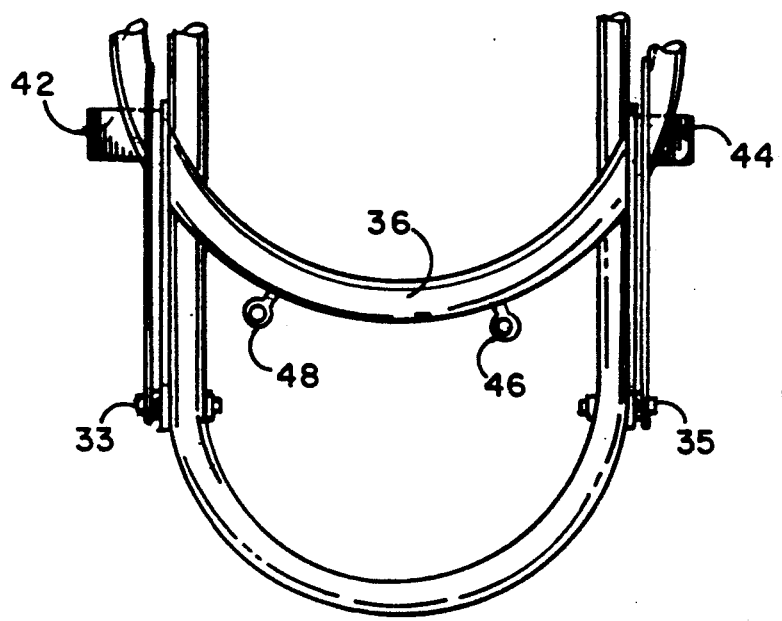
FIG. 4 is a detailed view of the eye bolts (hooks).

In FIG. 4, we see stationary ring, 36, which has been thrust forward (from the original mobile bag holder) and has segments, 38 and 40, welded to it. Segments 38 and 40 are riveted to main frame, 20, by rivets, 45. We see a clearer view of the two eye bolts, 46 and 48, and stops, 34 and 44, on stationary ring, 36. We also see pivot points, 33 and 35.

Figure 5:
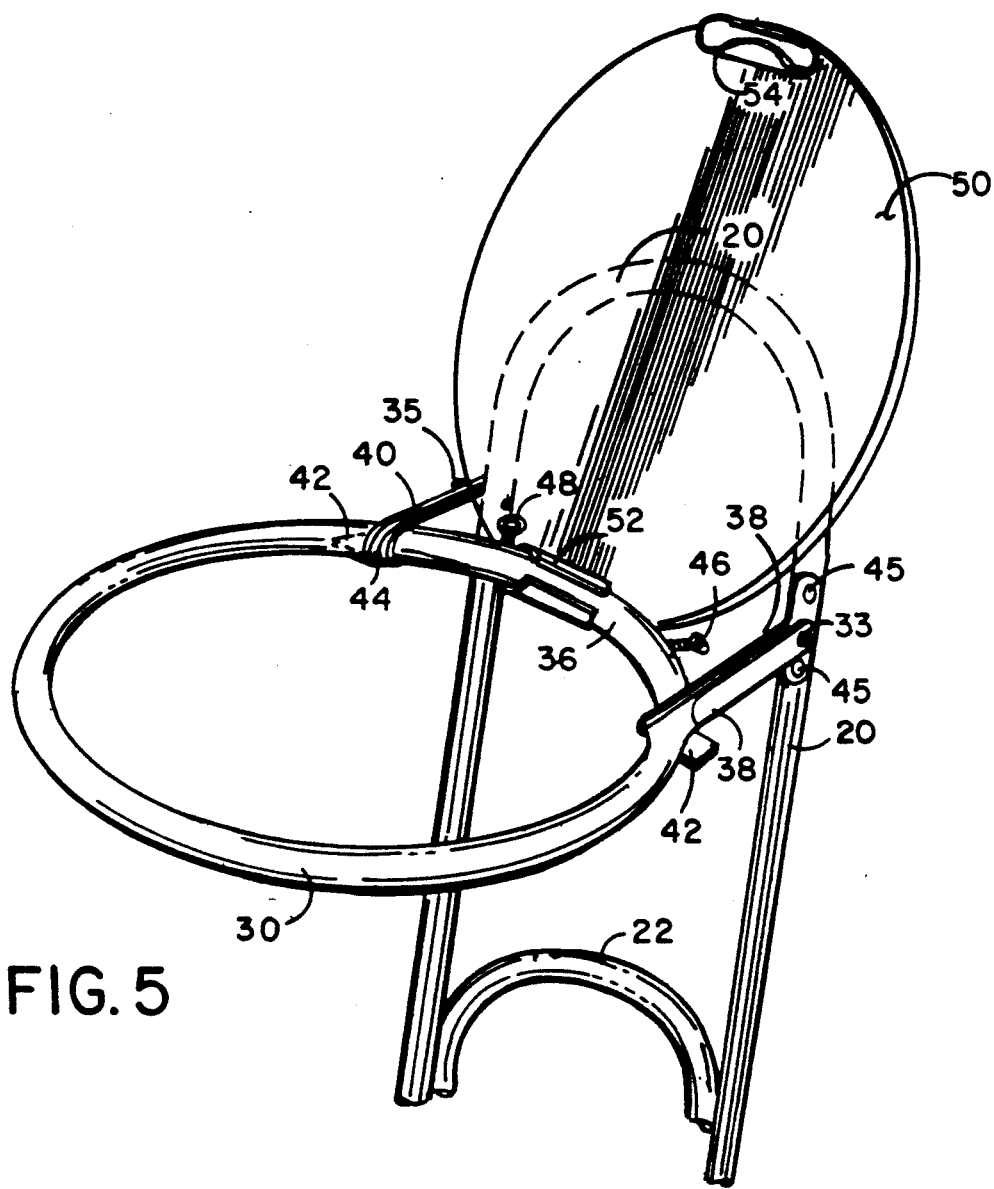
FIG. 5 is a view of the eye bolts (hooks) on stationary ring with the cover in open position.

In FIG. 5, we view eye bolts, 46 and 48, (hooks) so that when elasticized laundry bag, 27, is stretched over rings, 30 and 36, and placed around eye bolts (hooks), 46 and 48, that hinge, 52, is by-passed without removing cover, 50, from stationary ring, 36.

With the eye bolts (hooks), 46 and 48, in position, an elasticized bag may be affixed or removed from the unit quick and easy.

Figure 6:
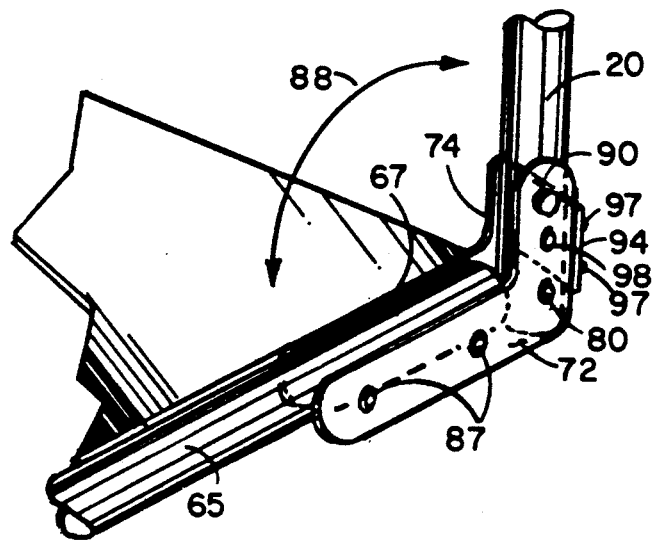
FIG. 6 is a detailed view of the base hinge assembly on one side.

Referring now to FIG. 6, we see base hinge, 72, in further detail, which is mated to hinge, 74. Main frame, 20, extends to the bottom and riveted to it by rivets, 97, is another stop, 94. Pivot point, 90, permits the base frame, 65, to rotate about it; however, when it is fully extended down, stop, 94, prevents the mated L-hinges, 72 and 74, from moving down any further. The mated L-hinges, 72 and 74, are riveted to the base frame, 65, by means of rivets, 87.

In FIG. 7, we see the rear view of the two sets of mated L-hinges which are riveted to the tips of base, 65, and bolted to frame, 20, at pivot points, 90 and 92, and when fully extended down comes to a rest against stops, 94 and 96.

All the L-hinges are identically indented at a similar point on the L-hinge so that when base frame, 65, is fully extended down to stops, 94 and 96, the indentations on the hinges slide around the tubing of frame, 20, and come to a rest firmly behind the curved end of the tubing of frame, 20. The indentations on the L-hinge act as stops to prevent the main frame, 20, from going forward and collapsing the base frame while the bag, 27, is being filled. Proper pressure is maintained on the indentations to the L-bars by a bolt, washer and nut assembly at pivot points, 90 and 92, to maintain their rigidity. Rigidity may be maintained at all times by merely tightening up nut and bolt assembly.

The rigidity in the L-hinges prevents the unit from collapsing while bag, 27, is being filled. The weight of the load is not being borne by rings, 30 and 36, which only serve to hold the bag, 27, in position while it is being filled. The weight of load in bag, 27, is at the bottom of the bag, 27, which is resting on plate, 66.

In FIG. 6, we see hole, 98, which has been drilled through hinges, 72 and 74, and main frame, 20, so that a bolt, lock washer and nut assembly may be inserted therein so that the base frame and main frame may be permanently fixed and stationary, at the option of the user. A similar hole is also drilled through hinges, 76 and 78, the end of main frame, 20, to receive the same assembly.

Referring to FIG. 8, we see two segments of the curve portion of wheel frame, 22, which is welded to and forms an integral part of main frame, 20. These segments are drilled at their ends to receive axle, 25, which has wheels, 24 and 26. The vehicle can then be wheeled about.

The offset in wheel frame, 22, is important to permit the vehicle and the bag to be aligned with base frame, 65, when receiving soiled laundry and to prevent bag, 27, from being in contact with wheels, 22 and 26, when it is wheeled about. It also allows the unit to be balanced when stored upright when in a collapsible position. When in a movable mode, the frame is tilted back and the wheels allow the vehicle to be moved about freely.

Referring to FIG. 9, we see a side view of the wheeled vehicle in its collapsed or storage state. Frame, 20, remains the same as before, however, ring, 30, is swung over the top of frame, 20, and hangs suspended under it with cover, 50. Base frame, 65, is collapsed upward. The fixed rigid portion of the ring, 36, remains the same, however, the arms, 38 and 40, have a segment of aluminum which has been bent into stops, 42 and 44. This causes the movable ring to stop at that location and to be held rigidly in place in order to receive the bag when it is in the open position. With the unit collapsed in this position, the cover is clamped to 30 now underneath the frame, 20, so that the entire unit can be stored in a reduced profile in a hospital, nursing home or other place where a laundry bag hamper stand is required.

Pivot points, 33, consist of a nylon washer (between stationary arm, 38, and swinging arm, 32), and a bolt, lock washer and lock nut are inserted at pivot point, 33. Pivot point, 35, also has the same set-up. The same principle which is used to keep the base frame, 65, taut is also used for the movable ring, 30.

Figure 10:
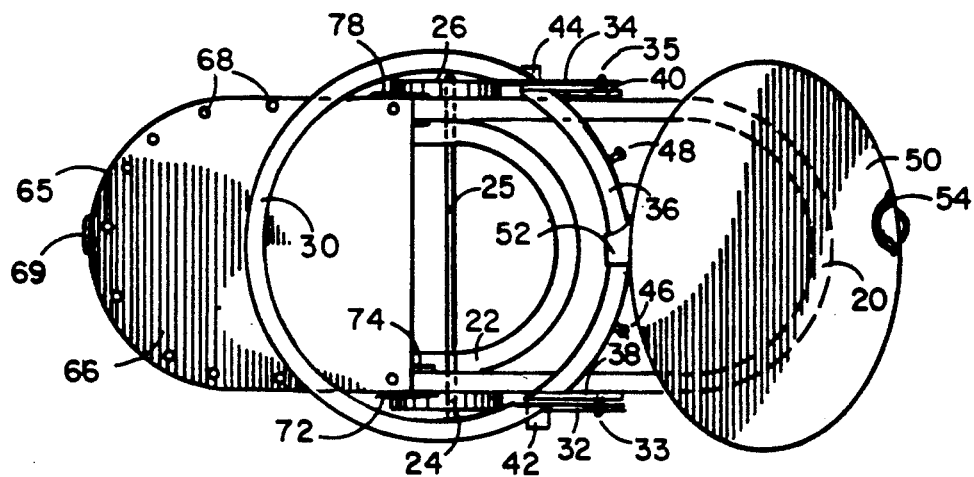
FIG. 10 is a top view of the wheeled vehicle ready to receive a cloth laundry bag or plastic trash bag.

Now referring to FIG. 10, we see a top view of the wheeled vehicle. Here the movable ring, 30, is shown with supports, 32 and 34, which permit the ring to pivot about points, 33 and 35, in order for the ring, 30, to be placed over the back of the handle (frame, 20) for storage. We also have a better view of the base frame, 65, and plate, 66, which is riveted to it by means of rivets, 68, which cause the plate of aluminum to be rigidly affixed to the aluminum tubing which makes up the base. We see the stationary part of the ring, 36, that is welded to supports, 38 and 40, which are riveted to the frame, 20. The movable portion of the ring, 30, swings around segments, 32 and 34, for utilization and holding of the bag, 27. It moves over the back when collapsed for storage. Wheels, 24 and 26, on axle, 25, permit the vehicle to be tilted back by means of attached frame, 20, to be wheeled about as needed. We also see the base, 65, with its hinges, 72, 74, 76 and 78.

Figure 11:
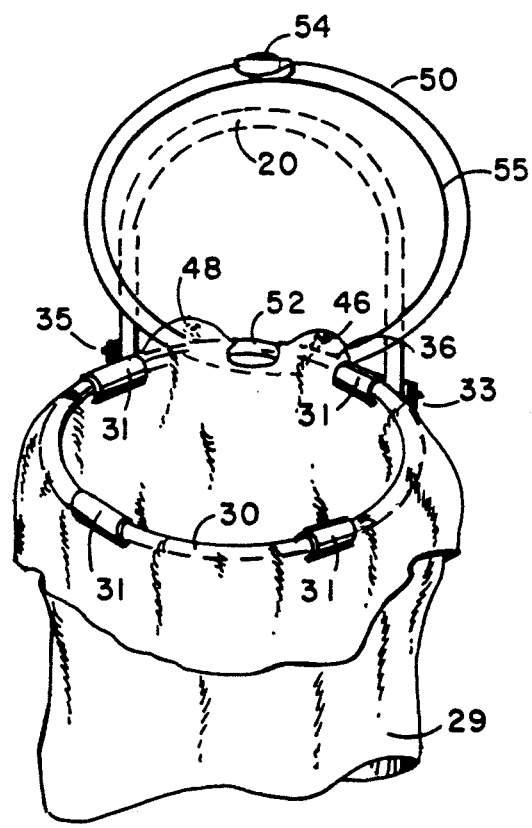
FIG. 11 is the bottom view of the cover with a vinyl foam tape.

In FIG. 11, we see a vinyl foam tape, 55, which is attached on the underside and secured along the periphery of cover, 50.

Figure 12:
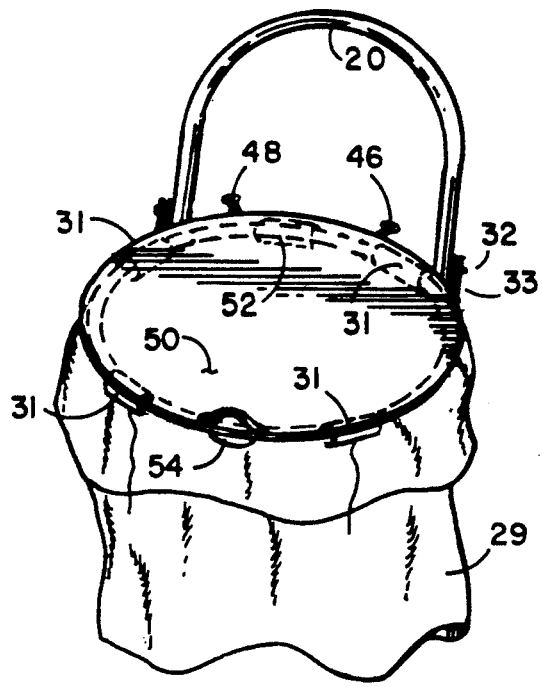
FIG. 12 is a side view of wheeled vehicle showing the cover closed and a plastic trash bag in place.

In FIG. 12, when cover, 50, is closed over rings, 30 and 36, and grips, 31, and plastic bag, 29, the vinyl foam tape rides over the four grips, 31, and edges of bag, 29, thus sealing plastic trash bag, 29. With a seal over plastic bag, 29, no odors are allowed to escape. Homeowners may now place and store their trash and garbage in bag, 29, without odors escaping. The unit with an attached plastic bag, 29, may now be used as a storage container to receive and store household trash and garbage and thus eliminate the need or use of metal and plastic barrels for storing household trash and garbage.

Although I have described my invention with reference to specific apparatus, I do not wish to be limited thereto. I only wish to be limited by the appended claims.

I claim:

1. The improvement in a mobile bag holder comprising
   a frame,
   a ring having a stationary segment affixed to the frame in a preselected position to accommodate a cover and a movable segment for mating with said stationary segment pivotally connected to the frame that can be swung out of the way for storage or placed parallel to the floor to receive a laundry bag in an open configuration thereby forming a hamperstand,
   a base having a solid flat surface which will not permit a wet laundry bag to contact the floor foldably connected to the frame,
   two wheels rotatably attached at preselected positions on the frame whereby it can be tilted to be movable on said wheels or placed erect so that the wheels disengage with the floor rendering the stand stationary.
   a removable, openable and clasped closeable cover having,
   two clamps of preselected material and shape for serving separate purposes of hinge and clasp affixed to said cover at preselected positions for engaging the bag receiving ring,
   one of said clamps for engaging the stationary segment forming a rotatable hinge and the other for engaging the bag covered movable segment forming a clasp whereby the cover can be entirely removed for replacing a bag and cleaning and held open for filling a bag and clasped closed when not in use.

2. The improvement in a mobile bag holder according to claim 1 which further includes,
   two eye bolts having smooth edges that will not puncture a laundry bag or tear laundry selectively positioned on the stationary segment of the ring whereby a cloth laundry bag with an elasticized opening, when placed on the ring, by-passes the hinge on the cover, hooking over the eye bolts, so that it may be used to receive soiled laundry when set erect as a laundry hamperstand.

3. The improvement in a mobile bag holder according to claim 2 wherein said foldable base connection includes,
   two sets of adjustable load yieldable L hinges,
   each hinge having identical indentations thereon,
   the indentations co-act with mating indentations on said frame whereby they maintain the frame upright with respect to the base when the bag is empty, and yield with load, permitting a full bag to gradually lower until the load is relieved when the bottom of the bag contacts the base,
   two rigid stops on the frame prevent the base from being pushed beyond a preselected point so that the base may support a full laundry bag.

4. The improvement in a mobile bag holder according to claim 3 which further includes,
   vinyl foam tape attached along the underside periphery of the cover whereby in a closed configuration, the cover and foam seal off odors especially from trash and garbage placed for storage in a bag used with the unit.

* * * * *